United States Patent [19]

Mueller

[11] Patent Number: 5,168,494
[45] Date of Patent: Dec. 1, 1992

[54] METHOD FOR TRANSMITTING A DIGITAL BROADBAND SIGNAL IN A TRIBUTARY UNIT CONCATENATION VIA A NETWORK OF A SYNCHRONOUS DIGITAL MULTIPLEX HIERARCHY

[75] Inventor: Horst Mueller, Hohenschaeftlarn, Fed. Rep. of Germany

[73] Assignee: Siemens Aktiengesellschaft, Munich, Fed. Rep. of Germany

[21] Appl. No.: 691,676

[22] Filed: Apr. 25, 1991

Related U.S. Application Data

[63] Continuation-in-part of Ser. No. 560,562, Jul. 30, 1990, abandoned.

[30] Foreign Application Priority Data

Nov. 29, 1989 [DE] Fed. Rep. of Germany ....... 3939466

[51] Int. Cl.$^5$ .......................... H04J 3/12; H04J 3/22
[52] U.S. Cl. ........................................ 370/84; 370/79; 370/99; 370/112
[58] Field of Search .................. 370/60, 79, 82, 83, 370/84, 94.1, 99, 102, 105.1, 110.1, 111, 112, 58.1, 58.2, 58.3

[56] References Cited

U.S. PATENT DOCUMENTS

| | | | |
|---|---|---|---|
| 4,484,327 | 11/1984 | Hanson | 370/84 |
| 4,787,081 | 11/1988 | Waters et al. | 370/84 |
| 4,862,480 | 9/1989 | Gupta | 370/84 |
| 4,967,405 | 10/1990 | Upp et al. | 370/58.1 |
| 4,998,242 | 3/1991 | Upp | 370/60 |
| 5,040,170 | 9/1991 | Upp et al. | 370/112 |

FOREIGN PATENT DOCUMENTS

| | | | |
|---|---|---|---|
| 0342510 | 11/1989 | European Pat. Off. | 370/94.1 |
| 4018687.13 | 12/1989 | Fed. Rep. of Germany | |

OTHER PUBLICATIONS

CCITT Recommendations G.707, G.708 & G.709 (no date), pp. 76–174.
ETSI TM3, Temporary Documents No. 110 (pp. 1–4 & FIGS. 1–4), and 42 (pp. 1–2 & FIG. 1), Oct., 1989.
IEEE Communications Magazine, Bd. 29, No. 3, Mar. 1989, New York, "SONET: Now It's the Standard Optical Network", Ralph Ballart et al, pp. 8–15.
IEEE Journal On Selected Areas In Communication, Bd. SAC 5, No. 1, Jan. 1987, New York, "A Synchronous DS4 Multiplexer With Cross-Connect Function", by I. Tokizawa et al, pp. 19–25.
"General Aspects of Digital Transmission System; Terminal Equipments, Recommendations G.700–G.795", CCITT, Blue Book, Vol. III–Fascicle III. 4, Nov. 1988, pp. 121–128, 142–145.

Primary Examiner—Douglas W. Olms
Assistant Examiner—Alpus H. Hsu
Attorney, Agent, or Firm—Hill, Van Santen, Steadman & Simpson

[57] ABSTRACT

Method for transmitting a digital broadband signal in a tributary unit concatenation via a network of a synchronous digital multiplex hierarchy. A pointer for positional identification in a frame is allocated to the first tributary unit in a tributary unit concatenation; instead of a pointer, the further tributary units receive a concatenation indicator. Every cross-connect equipment along a transmission link recognizes the tributary unit concatenation and forwards the tributary units thereof in the correct sequence. When a clock matching is required in the case of a first tributary unit, a pointer skip is initiated at all further tributary units. This requires hardware and software. This is eliminated when all tributary units (TU-12$_1$ through TU-12$_5$) containing the broadband signal (DSa) have a pointer (PTR1 through PTR5) having the value of the positional identification of the first tributary unit (TU-12$_1$) allocated to them. The individual tributary units (TU-12$_1$ through TU-12$_5$) can then pass the cross-connect equipment, if necessary with an individual pointer skip (PS), independently of one another. A restoration of the tributary unit concatenation occurs at the reception side after the recognition of the pointers (PTR1 through PTR5) in that leading tributary units (TU-12$_2$, TU-12$_5$) are delayed by delay elements (L2, L5).

4 Claims, 12 Drawing Sheets

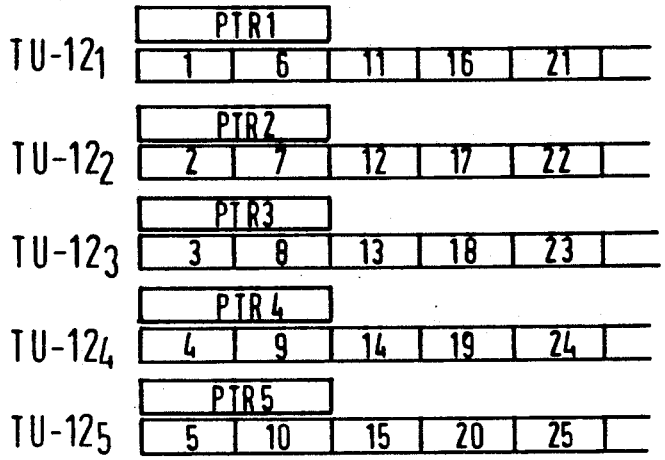
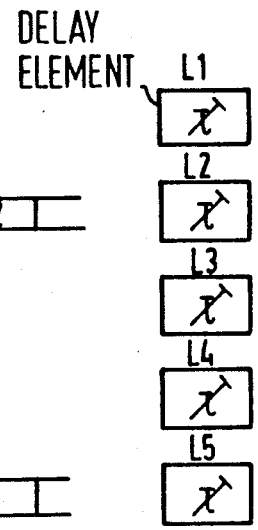
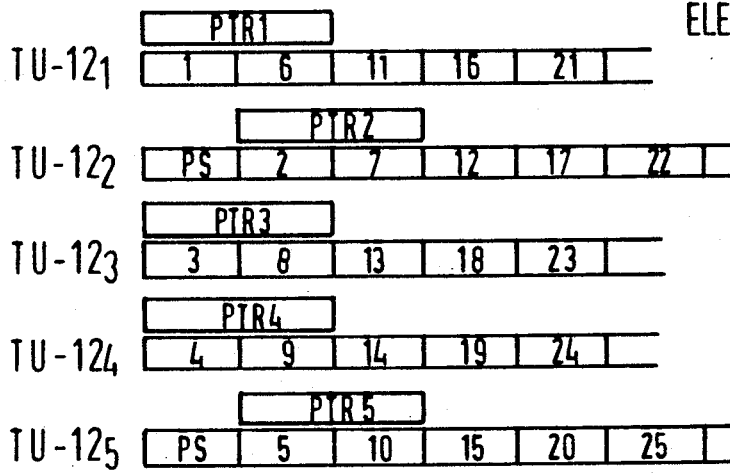
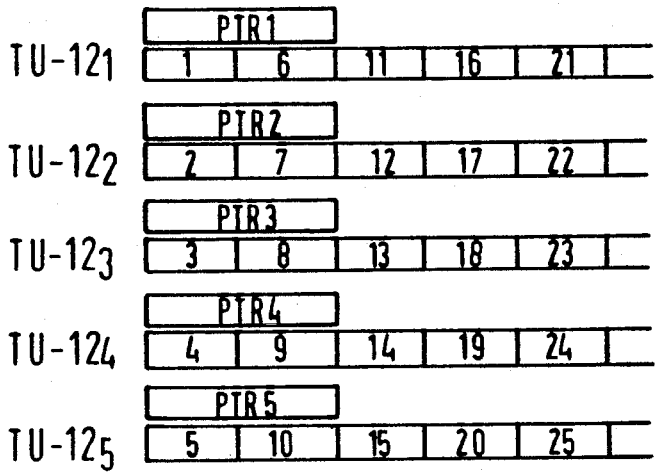
FIG 5a
FIG 5b
FIG 5c
FIG 5d
FIG 5e

FIG 6

METHOD FOR TRANSMITTING A DIGITAL BROADBAND SIGNAL IN A TRIBUTARY UNIT CONCATENATION VIA A NETWORK OF A SYNCHRONOUS DIGITAL MULTIPLEX HIERARCHY

This is a continuation-in-part of application Ser. No. 560,562, filed Jul. 30, 1990, now abandoned.

BACKGROUND OF THE INVENTION

The present invention is directed to a method for transmitting a digital broadband signal having the bit rate of an intermediate hierarchy level via a multiplexing device, via a link in a network having network node equipment controlled by an exchange and via a demultiplexing device of a synchronous digital multiplex hierarchy.

Bit rates of 1544 kbit/s, 6312 kbit/s and 44736 kbit/s are used in the North American hierarchy. The European hierarchy operates with, among others, bit rates of 2048 kbit/s; 8448 kbit/s and 34368 kbit/s. Intermediate hierarchy levels can be formed by a multiple of these bit rates.

The synchronous digital multiplex hierarchy (SDH) is defined in CCITT recommendations G.707, G.708 and G.709. According to the last-cited recommendation, the transmission of tributary unit concatenations is also provided. In the TM3 Meeting (Transmission and Multiplexing) in Brussels from Apr. 24–28, 1989 of the European Transmission Standards Institute ETSI, a multiplexing structure was proposed and the formation of tributary unit concatenations was proposed in Temporary Documents No. 42, 62 and 110 in Aveiro Oct. 23–28, 1989.

FIG. 1 depicts the multiplexing structure that was revealed at the TM3 Meeting. Reference characters are defined as follows: A denotes section, AU denotes administration unit, C denotes container, H denotes digital signal, POH denotes path overhead, PTR denotes pointer, SOH denotes section overhead, STM denotes synchronous transport module, TU denotes tributary unit, TUG denotes tributary unit group and VC denotes virtual container.

Instead of the numbers following C, TU, TUG and VC, an n is placed in that position for a general case. The number of parallel lines provided is indicated at the lines.

FIG. 2 depicts a network N for the synchronous digital multiplex hierarchy SDH having the network node equipment (cross-connect) CC and having an exchange (telecommunication management network) TMN that controls them. The link provided between a multiplexing equipment MUX and a demultiplexing equipment DEMUX and provided with cross-connects CC1 through CC5 is emphasized by a thick line. Only one transmission direction is thereby shown.

The broadband signals DS to be transmitted are inserted into containers C-n in the multiplexing equipment M on the basis of positive filling. Each of these containers is supplemented by the addition of a path overhead VC-n POH to form a virtual container VC-n that is periodically transmitted in a synchronous transport module STM-1. The first byte of a virtual container VC-n is indicated by a pointer AU-n PTR or TU-n PTR whose value defines the initial position of the virtual container in the transmission frame. As such, the virtual container VC-n usually serves a higher hierarchy level. Together with the pointer AU-n PTR or TU-n PTR allocated to it, such a virtual container forms a tributary unit AU-n or TU-n. A plurality of these having the same structure can in turn be combined to form a tributary unit group TUG-n. There are tributary unit groups TUG-21 and TUG-32 for the North American 1.5-Mbit/s hierarchy and TUG-22 and TUG-31 for the 2-Mbit/s hierarchy that, among others, is standard in Europe.

According to the afore-mentioned CCITT recommendation G.709, Section 3.3.7, tributary units TU-21 having a bit rate of 6312 kbit/s or TU-22 having a bit rate of 8448 kbit/s can be concatenated. In the Temporary Documents that have likewise been cited, a concatenation of tributary units TU-11 having a bit rate of 1544 kbit/s or TU-12 having a bit rate of 2048 kbit/s is also proposed. For example, a 11200-kbit/s signal can be transmitted for future services as a tributary unit concatenation TU-12-5c ($5 \times VC\text{-}12 = 5 \times 2240$ kbit/s, maximum bit rate) for a LAN (local area network) coupling or other broadband signals. The position character c indicates the concatenation.

FIG. 3 depicts a section AB' expanded in comparison to the section AB of the multiplexing structure of FIG. 1 bounded by a broken line. This can basically contain additional containers C-12-mc, C-22-mc and C-31-mc, virtual containers VC-12-mc, VC-22-mc and VC-31-mc and tributary units TU-12-mc, TU-22-mc and TU-31-mc.

For example, a broadband signal having a bit rate of 11200 kbit/s can be supplied via the input E1 when m=5 is selected. A tributary unit concatenation TU-12-5c is formed via a container C-12-5c and a virtual container VC-12-5c. A broadband signal of $m \times 8448$ kbit/s can also be supplied via the input E2 and a broadband signal of $m \times 34368$ kbit/s can be supplied via the input E3. Further inputs are conceivable. A different number can be respectively set for m.

Such an arrangement can be correspondingly inserted into the upper half of the multiplexing structure of FIG. 1.

In tributary unit concatenations, a pointer is allocated to the first tributary unit, this indicating the beginning thereof in a virtual container given the incorporation of the tributary unit concatenation in a virtual container. Instead of a pointer, all further tributary units contain a concatenation indicator CI. This indicates that the tributary unit concatenation must be kept together and that the pointer operations of the preceding tributary unit must be implemented in the same manner for the following tributary unit. As FIG. 4 depicts, identical pointer skips PS must be undertaken in the other tributary units TU-12$_2$ through TU-12$_5$ given a pointer skip PS for clock matching of the first tributary unit TU-12$_1$ with the 11200-kbit/s signal. What is thereby achieved is that the sequence of the bytes is not disturbed.

For example, a pointer skip can occur in a cross-connect CC when the tributary unit concatenation TU-12-5c contained in a standard transport module STM-1 is refilled into a different standard transport module STM-1.

In this method, every cross-connect must comprise means (hardware and software) for processing these concatenation indicators and for the common pointer skip of the tributary unit concatenation. This requires a special control. What is also compulsory is that the tributary units of a tributary unit concatenation are also successively transmitted.

It was also proposed to directly concatenate successive tributary units in a virtual container (German reference P 4018687.3). This, however, has the disadvantage that a mixing of a tributary unit concatenation having m=4 with tributary units TU-31 is not possible in the same standard transport module STM-1. Four concatenated tributary units TU-12 already respectively occupy a column in the frame of the four tributary unit groups TUG-37. Since a closed 34-Mbit/s signal requires the space of a tributary unit group TUG-31, it cannot be transmitted in the same standard transport module STM-1.

SUMMARY OF THE INVENTION

It is an object of the present invention to provide a method for the transmission of tributary unit concatenations that can contain tributary units as well as tributary unit groups as well as both in common and wherein the outlay for the transmission thereof is low in the exchange and in the network.

This object is inventively achieved by a method for transmitting a digital broadband signal having a bit rate of an intermediate hierarchy level via a multiplexing equipment, via a link network having cross-connect equipment controlled by an exchange, and via a demultiplexing equipment of a synchronous digital multiplex hierarchy. The broadband signal is converted into a tributary unit concatenation composed of at least two tributary units (TU-11, TU-12, TU-21, TU-22, TU-31, TU-32) or composed of at least two tributary unit groups (TUG-21, TUG-22, TUG-31, TUG-32). A first pointer (PTR1) is allocated the first tributary unit (TU-n$_1$) of the tributary unit concatenation. Respectively, one pointer (PTR2-PTR5) of an identical value as that of the first pointer (PTR1) is allocated to all following tributary units (TU-12$_2$ through TU-12$_5$) and the tributary units (TU-12$_1$ through TU-12$_5$) are transmitted independently of one another. The chronological arrival of the tributary units (TU-12$_1$ through TU-12$_5$) is recognized at the receive side via their pointers (PTR1-PTR5) and the tributary unit concatenation is chronologically regenerated by a delay of leading tributary units (TU-12$_1$ through TU-12$_5$). Furthermore, the tributary unit concatenation can be formed of at least one tributary unit (TU-11, TU-12, TU-21, TU-22, TU-31, TU-32) and of at least one tributary unit group (TUG-21, TUG-22, TUG-31, TUG-32).

The invention is based on the perception that the tributary units can be transmitted via the selected link independently of one another and that the cross-connect equipment thereby need have no knowledge of the concatenation.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIGS. 5A through 5E depict the overall method; and

FIG. 6 depicts the insertion of a 11200-kbit/s signal into a virtual container VC-4 as tributary unit concatenation TU-12-5c;

DESCRIPTION OF THE PREFERRED EMBODIMENT

FIGS. 5A through 5E depicts the steps of the method of the present invention. First, a broadband signal (DSa) to be transmitted is shown in FIG. 5A with its first 25 bytes. FIG. 5B then depicts a 11200-kbit/s signal of the transmission side composed of five tributary units TU-12$_1$ through TU-12$_5$ having five allocated pointers PTR1 through PTR5 to all of which is allocated the pointer value of the pointer PTR1 of the first tributary unit TU-12$_1$. A check is carried out in every cross-connect equipment CC1 through CC5 to see whether a clock matching is required for one or more tributary units TU12$_1$ through TU12$_5$. When this is the case, a pointer skip PS is individually carried out. After traversing the last cross-connect equipment CC5, the relationships shown, for example, in FIG. 5C results. At the receive side, delay elements L2 and L5 are inserted that yield a delay by one byte. According to FIG. 5D, the condition according to FIG. 5B is thereby restored. FIG. 5E depicts the broadband signal DSb to be received after a grouping of the tributary units TU-12$_1$ through TU-12$_5$.

The method of the present invention enables a combining of different tributary units, for example TU-12 with TU-22 or, respectively, TU-11 with TU-21. It must merely be assured that the same concatenation strategy is applied in the multiplexing equipment MUX and in the demultiplexing equipment DEMUX. A combination of different tributary units has the advantage that jitter is lower when recovering the closed signal. When combining five tributary units TU-12 to form a 11200-kbit/s signal, for example, five byte skips can appear in the recover signal, whereas only two byte skips are possible when combining a tributary unit TU-12 and a tributary unit TU-22 to form a 11200-kbit/s signal.

Figure 6:
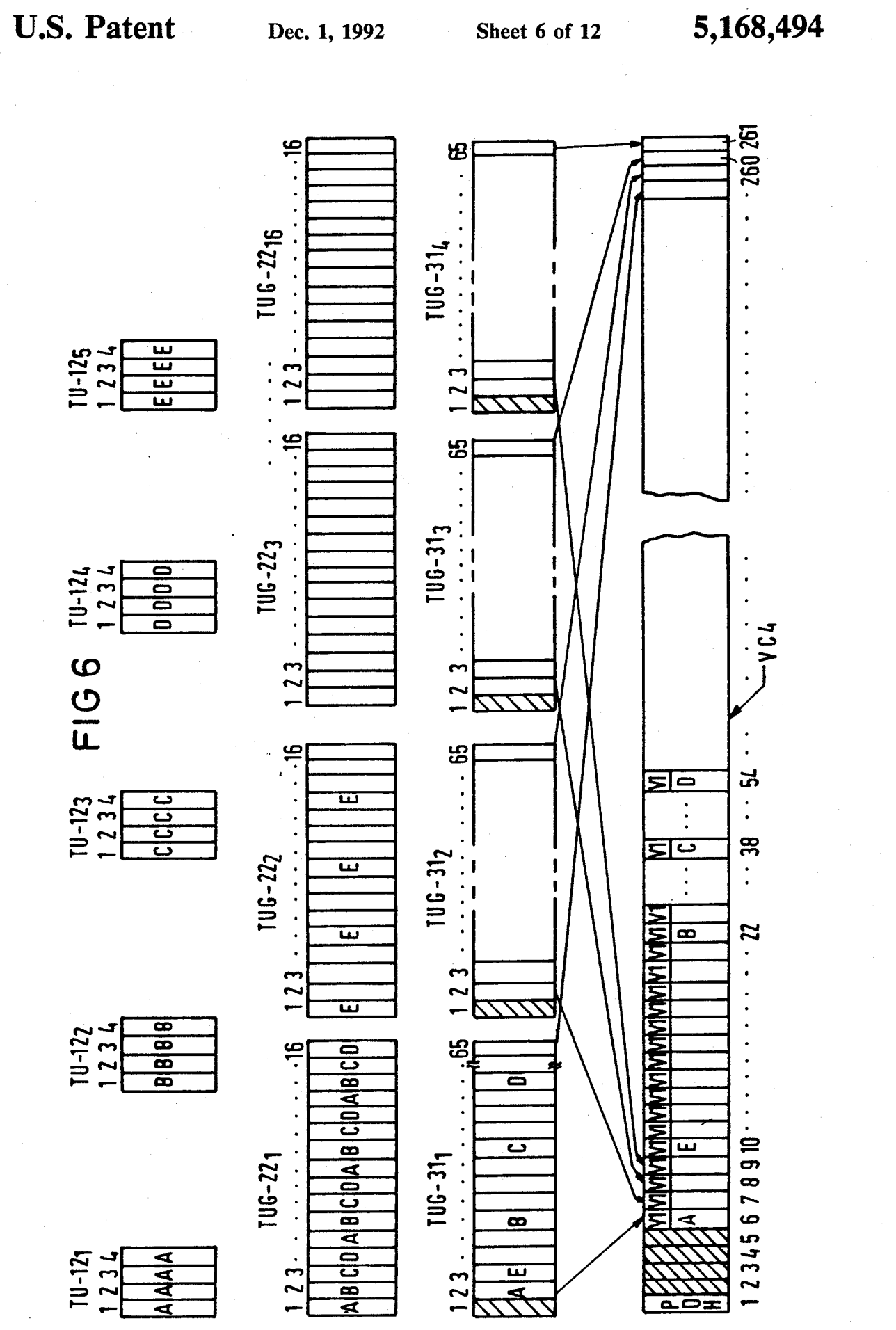

FIG. 6 depicts an especially advantageous linking strategy that enables a simple mixing of a closed 11200-kbit/s signal in tributary units TU-12$_1$ through TU-12$_5$ with tributary unit groups TUG-22$_1$ through TUG-22$_{16}$ or, respectively, TUG-31$_1$ through TUG-31$_4$. The tributary units TU-12$_1$ through TU-12$_5$ initially completely fill the tributary unit group TUG-22$_1$. The columns a through d are therewith accommodated. The columns e of the tributary unit TU-12$_5$ are inserted into the tributary unit group TUG-22$_2$. Since the tributary unit groups TUG-22$_1$ through TUG-22$_4$ are exclusively accommodated in the tributary unit group TUG-31$_1$, the tributary unit groups TUG-31$_2$ through TUG-31$_4$ are available for the transmission of, for example, three 34368-kbit/s signals. In the virtual container VC-4, the tributary units TU-12$_1$ through TU-12$_5$ occupy the columns 6, 22, 38, 54, 70, 86, etc. as well as the columns 10, 74, etc. V1 references pointers for tributary units combined in the super frame.

Figure 1:
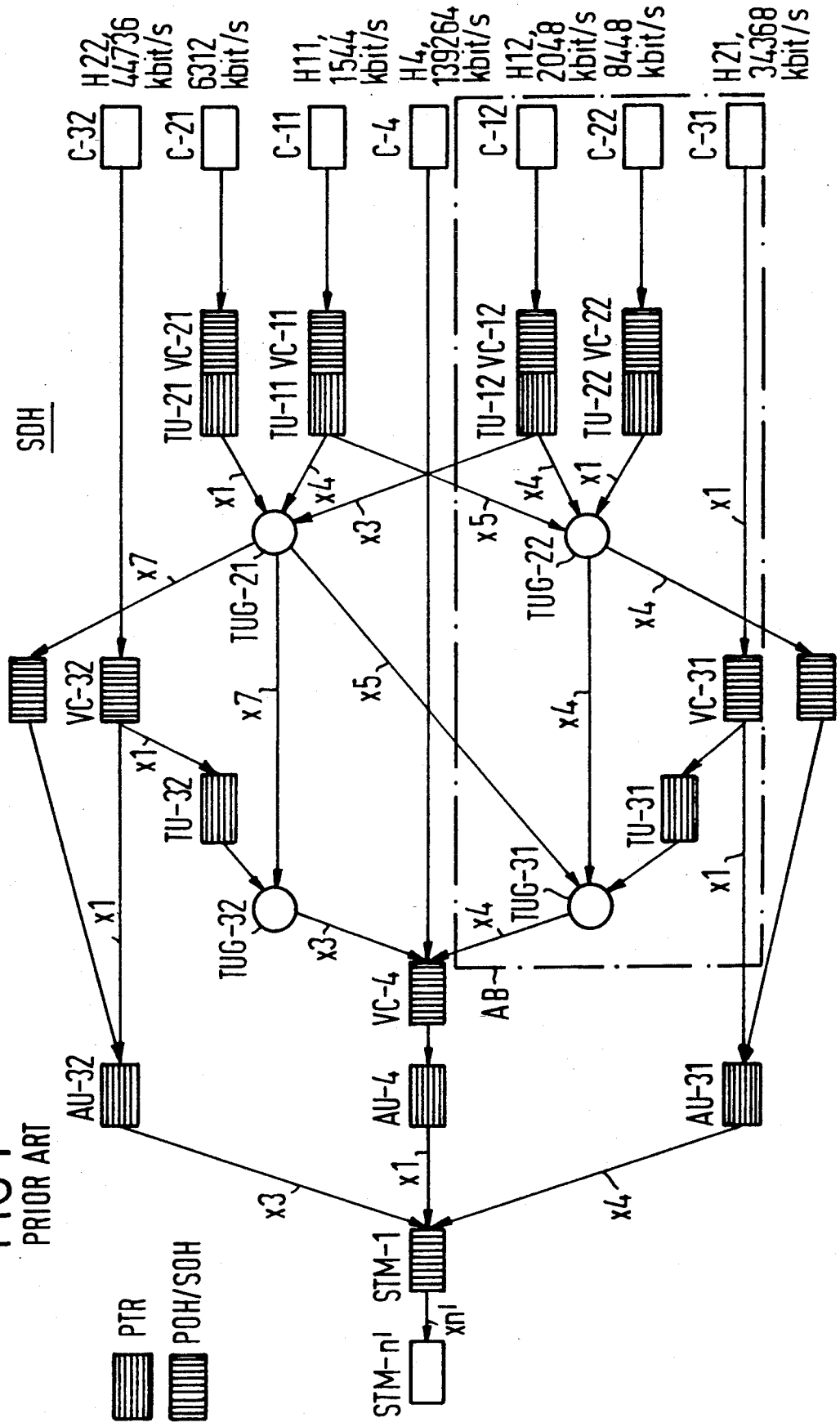
FIG. 1 depicts a SDH multiplexing structure.
Figure 2:
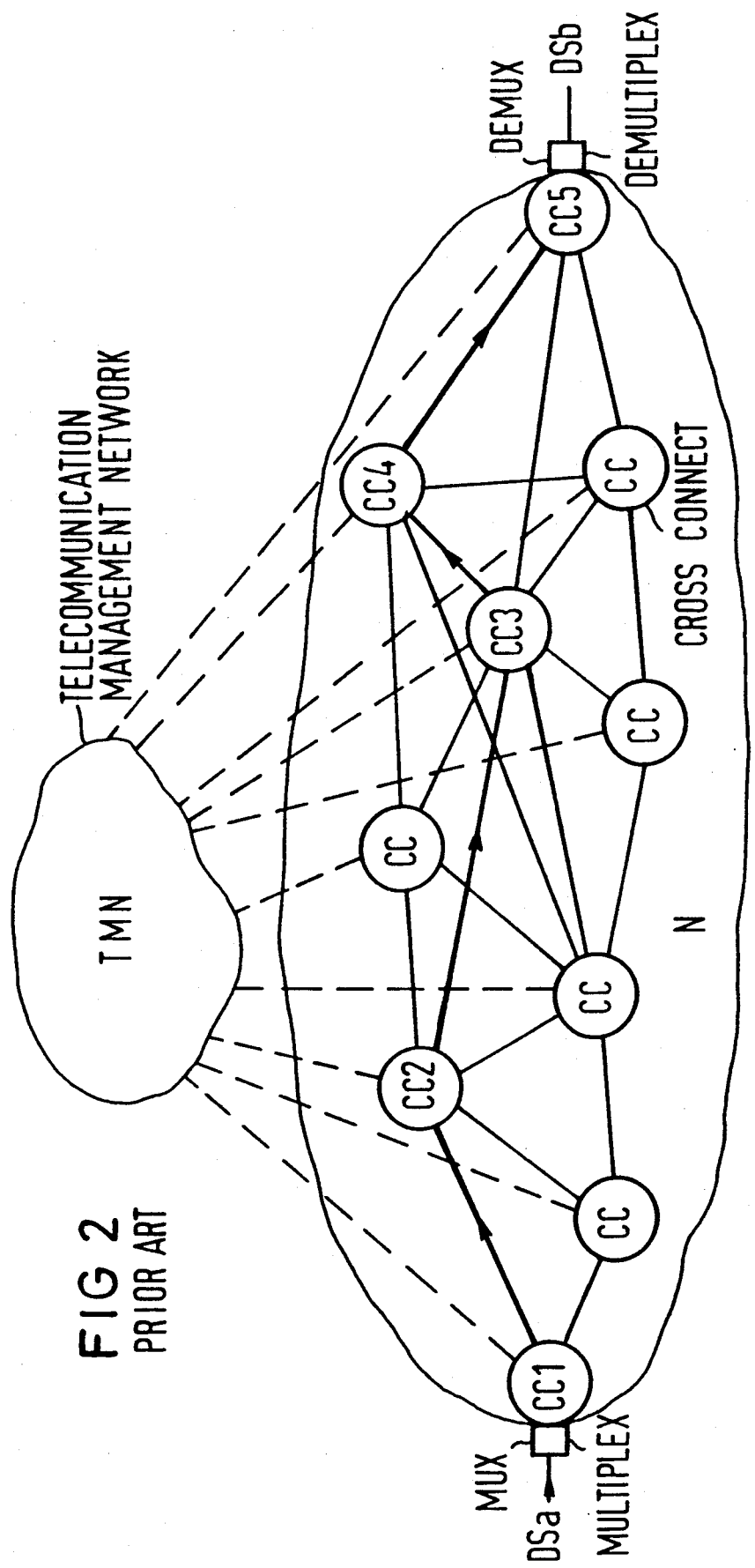
FIG. 2 depicts a SDH transmission network.
Figure 3:
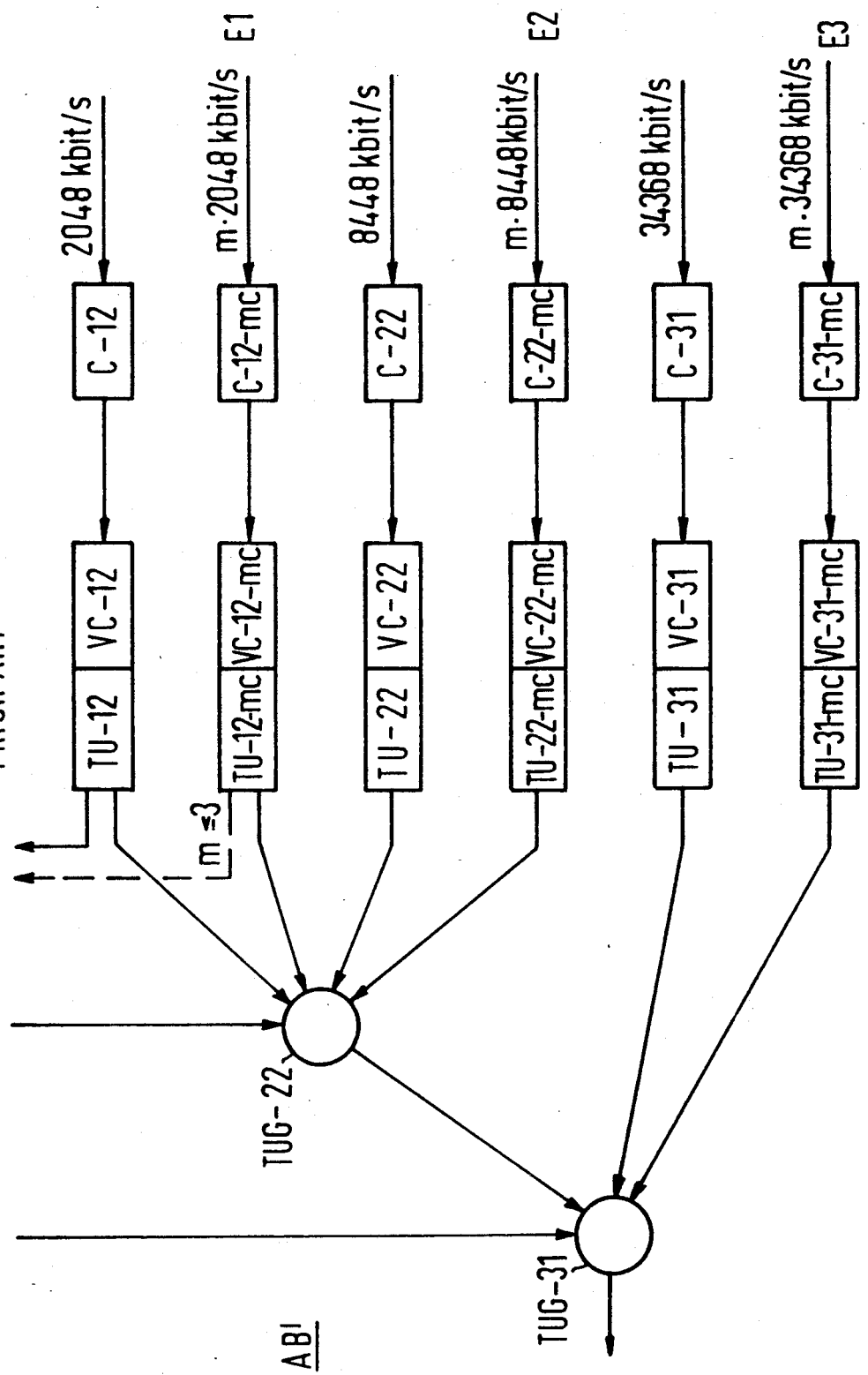
FIG. 3 depicts a SDH multiplexing structure for tributary unit concatenations.
Figure 4:
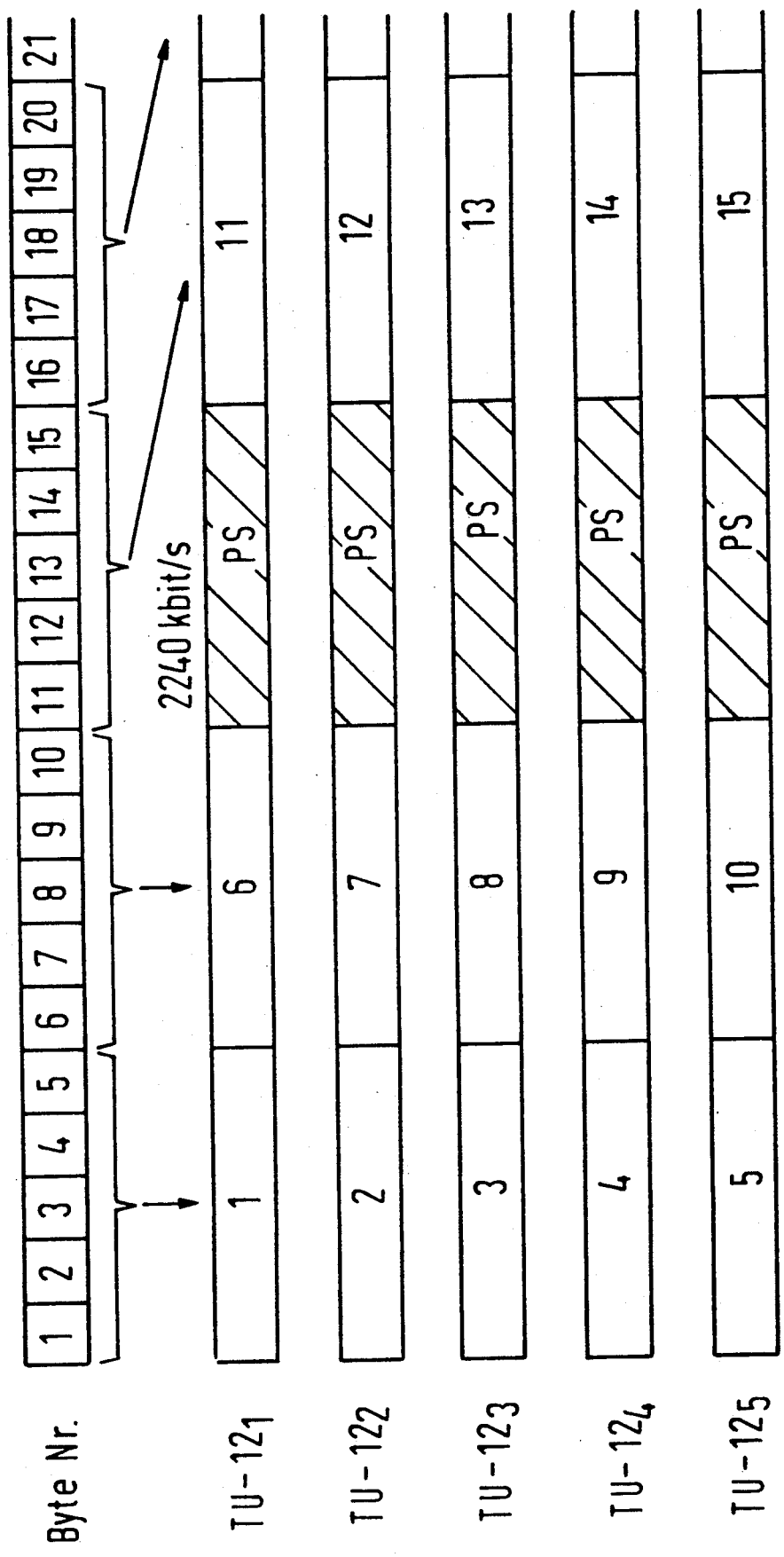
FIG. 4 depicts a pointer skip of a known type of five tributary units TU-12 in a 11200-kbit/s signal.
Figure 7:
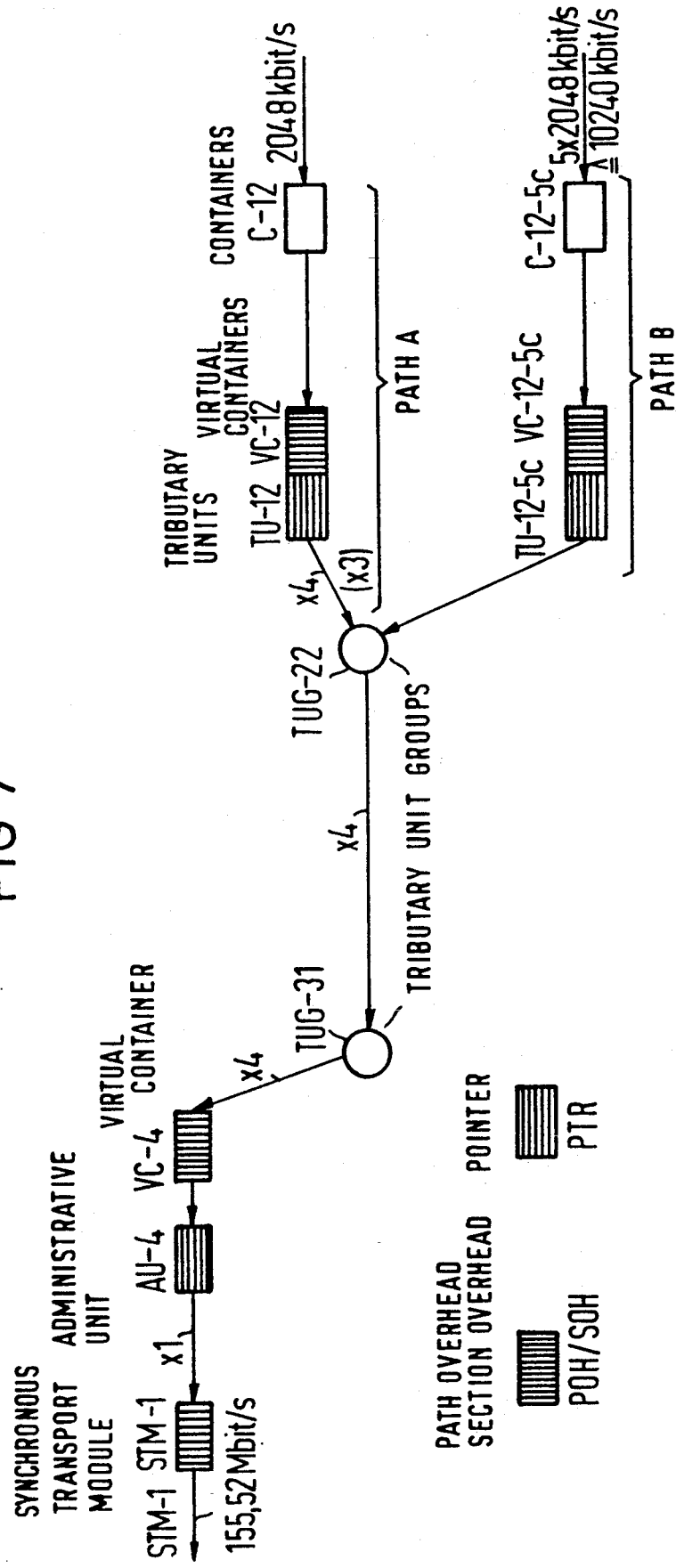
FIG. 7 depicts a block circuit diagram of a multiplex path in the multiplexing structure.

FIG. 7 shows a multiplex path previously shown in FIG. 1 for 64 containers C-12 via the tributary unit groups TUG-22 and TUG-31 to the synchronous transport module STM-1, whereby the path of a respective container C-12 to the tributary unit group TUG-22 is referenced as path A. Inventively, a path B that can replace 5 paths A is also provided between a container C-12-5c and the tributary unit group TUG-22. The container C-12-5c provides for the acceptance of a 10240 kbit/s signal that is formed of five 2048 kbit/s signals. It is converted into a virtual container VC-12-5c upon addition of a path overhead POH and is converted into a tributary unit TU-12-5c upon addition of a pointer PTR. In this and in the following block circuit diagrams, these elements are to be understood both as signals as well as circuit units. Demultiplexing occurs in a direction opposite the arrow direction.

Figure 8:
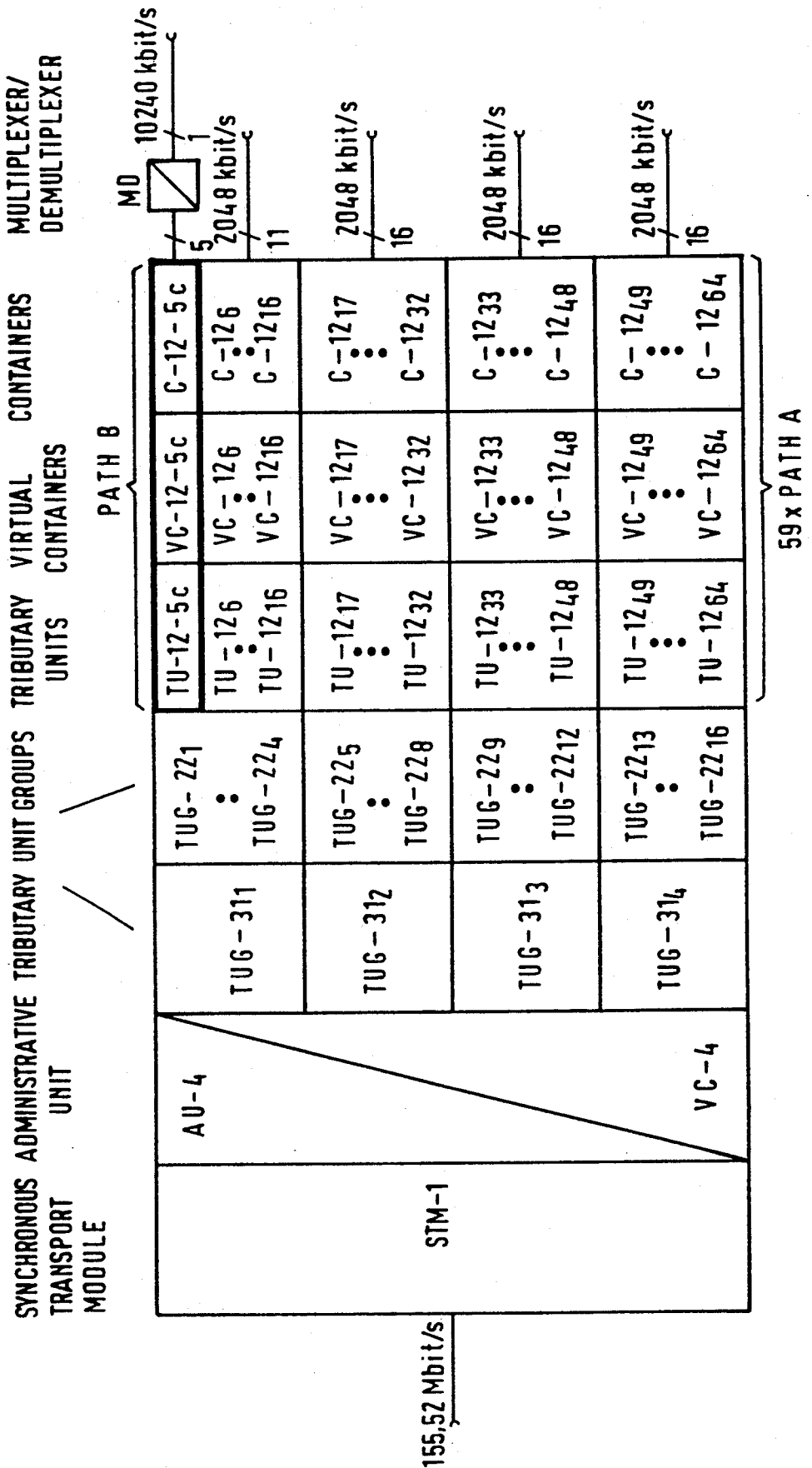
FIG. 8 depicts a more detailed diagram of the multiplex path in the FIG. 7 multiplexing structure.

FIG. 8 shows the multiplex path of FIG. 7 for both transmission directions having, for example, a path B and 95 paths A in greater detail. The path B is preceded or, respectively, followed by a demultiplexer/multiplexer MD for grouping or separating the five 2048 kbit/s signals OP'through OP5.

Figure 9:
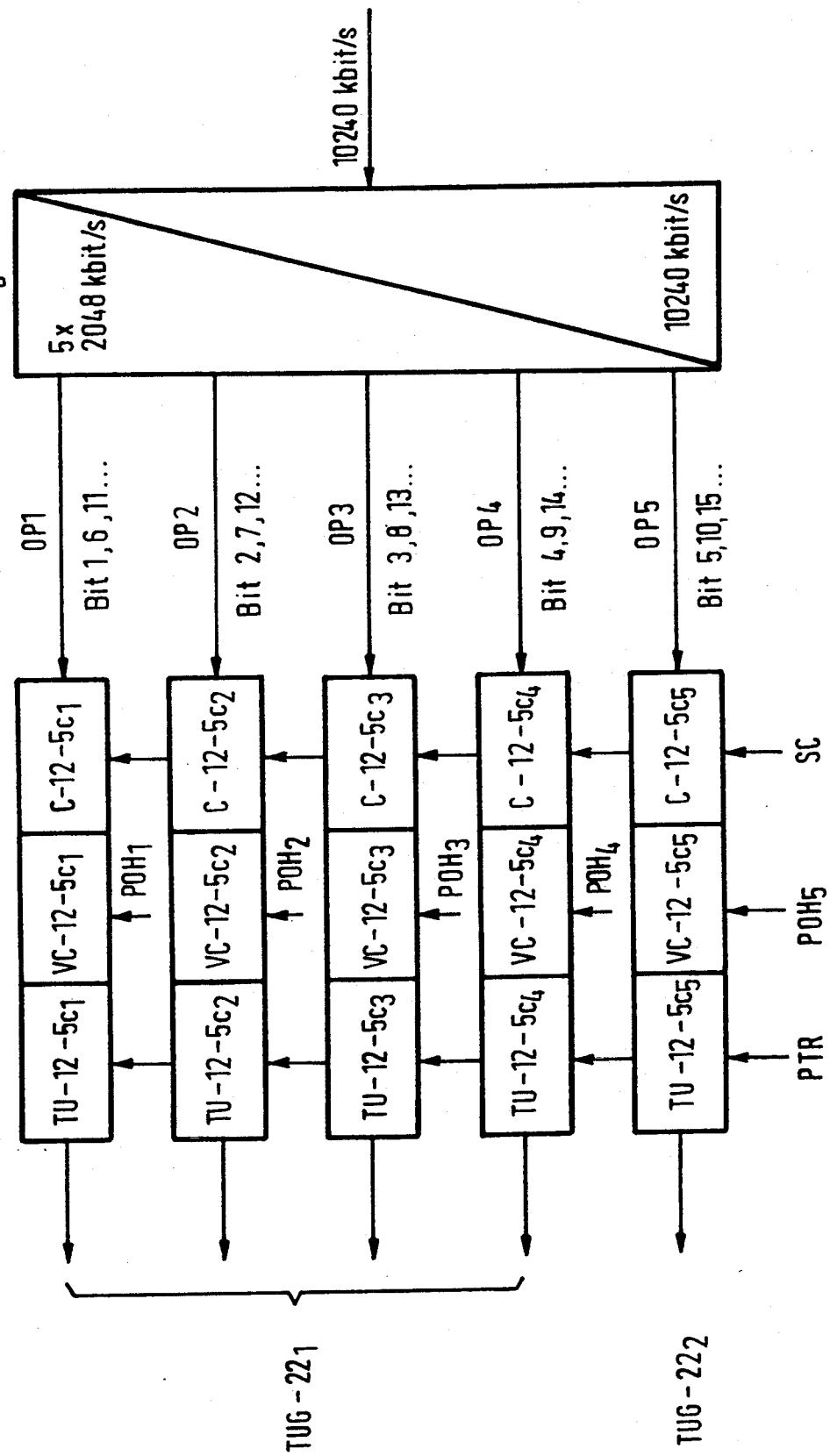
FIG. 9 depicts details of an inventive part of the FIG. 8 diagram for multiplex operation.

The path B for the multiplexing case is shown in greater detail in FIG. 9 together with a demultiplexer D that distributes the 10240 kbit/s signal bit-by-bit onto the five 2048 kbit/s signals OP1 through OP5 these being inserted into the containers $C\text{-}12\text{-}5c_1$ through $C\text{-}12\text{-}5c_5$ on the basis of a signal SC upon insertion of justification control bits. Theses containers are subsequently augmented to form virtual containers $VC\text{-}12\text{-}5c_1$ through $VC\text{-}12\text{-}5c_5$ and tributary units $TU\text{-}12\text{-}5c_1$ through $TU\text{-}12\text{-}5c_5$. The latter are again distributed onto the tributary units groups $TUG\text{-}22_1$ and $TUG\text{-}22_2$. The virtual containers are thereby individually formed upon attachment of path overheads $POH_1$ through $POH_5$, and the tributary units $TU\text{-}12\text{-}5c_1$ through $TU\text{-}12\text{-}5c_5$ arises with a common pointer PTR.

Figure 10:
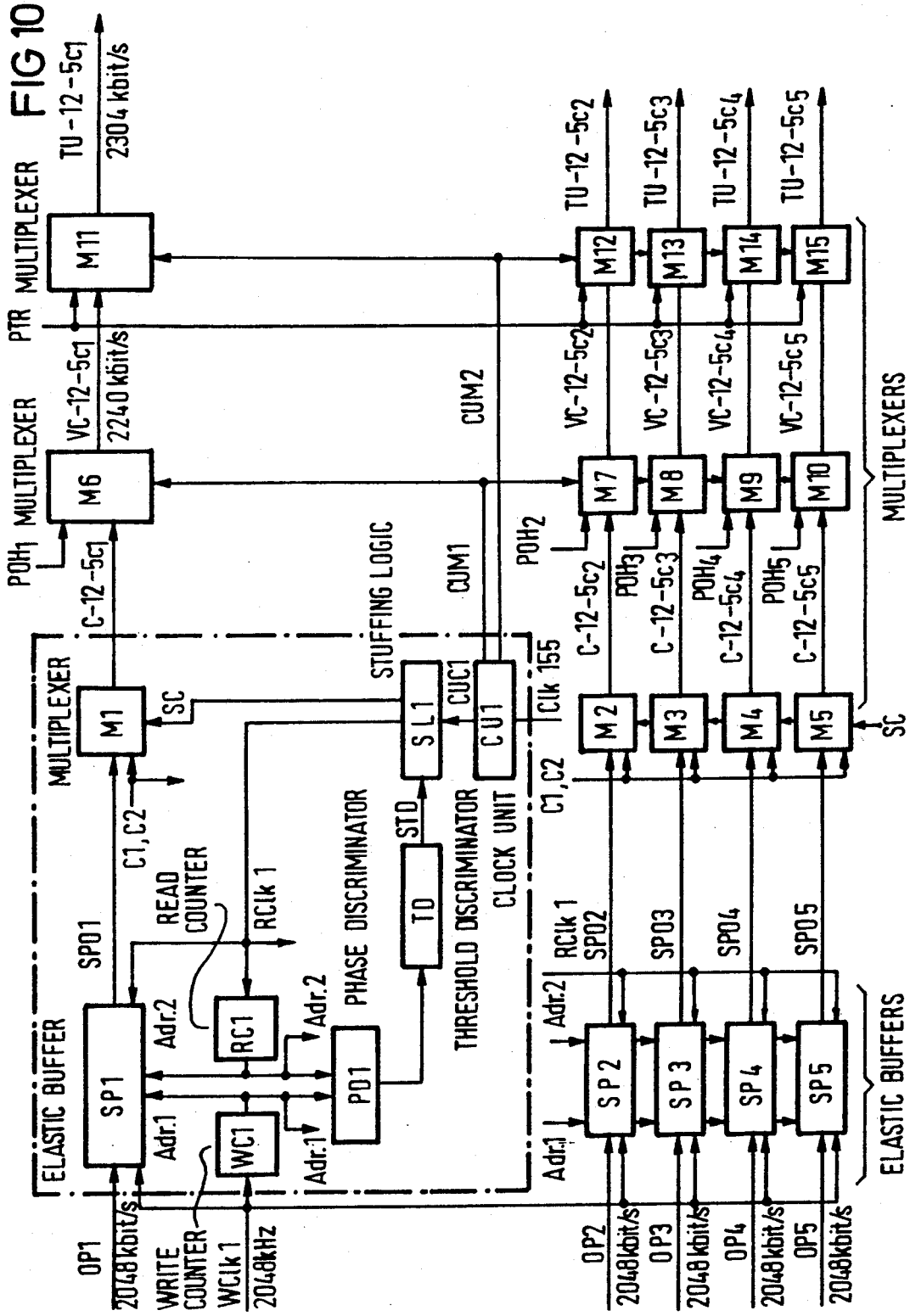
FIG. 10 depicts a circuit diagram of the FIG. 9 part.

FIG. 10 shows the circuit diagram of the path B of FIG. 9. It contains elastic buffers SP1 through SP5, a write counter WC1, a read counter RC1, a phase discriminator PD1, a threshold discriminator TD, a stuffing logic SL1, a clock unit CU1, and multiplexers M1 through M15. The elastic buffer SP1, the write counter WC1, the read counter RC1, the phase discriminator PD1, the threshold discriminator TD, the stuffing logic SL1, the clock unit CU1 and the multiplexer M1 form a unit bounded with dot-dash lines for generating the container $C\text{-}12\text{-}5c_1$. The multiplexer M6 generates the virtual container $VC\text{-}12\text{-}5c_1$ and the multiplexer M11 generates the tributary unit $TU\text{-}12\text{-}5c_1$. The addresses Adr1 and Adr2 are supplied in common to all elastic buffers SP1 through SP5; the signal SC is supplied in common to all multiplexers M1 through M5, the control clock CUM1 is supplied in common to all multiplexers M6 through M10; and the control clock CUM 2 is supplied in common to all multiplexers M11 through M15.

The signal OP1 is written into the elastic buffer SP1 with a 2048 kbit/s clock WC1k1, whereby the write counter WC1 defines a write-in address Adr1. The read-out from the elastic buffer SP1 occurs with a read-out clock RC1k1, whereby the read counter RC1 defines the read-out address Adr2. A comparison between the write-in address Adr1 and the read-out address Adr2 is implemented in the phase discriminator PD1. When both fall below a defined threshold, the threshold discriminator TD outputs a signal STD upon whose initiation a pulse of the clock CUC1 supplied by the clock unit CU1 is gated out in the stuffing logic SL1. This unit is in turn supplied with a 155.52 MHz clock C1k155. Control clock CUC1 for the stuffing logic SL1 as well as control clocks SUM1 and CUM2 for a drive of the multiplexers M6 through M10 or, respectively M11 through M15 are generated in the clock unit CU1.

A signal SPO1 is read out at the output of the elastic buffer SP1 with the read-out clock RC1k1. Justification control bits C1 and C2 according to CCITT are attached in the multiplexer M1 by a signal SC from the stuffing logic SL1, as a result the container $C\text{-}12\text{-}5c_1$ appears at its output. The clock matching of the 2048 kbit/s signal to the transmission bit rate of the STM-1 signal occurs therein by stuffing. It thus corresponds to the "asynchronous mapping of 2048 kbit/s" defined in CCITT Recommendation G.709, Section 5.6.1.

The signals OP2 through OP2 are written into the elastic buffers SP2 through SP5 with the 2048 kHz clock WC1k1 and with the address Adr1. The read-out occurs in common with the read-out clock RC1k1 and the address Adr2. The multiplexers M2 through M5 are supplied with the justification control bits C1 and C2 like the multiplexer M1. It is thereby assured that the clock matching with stuffing is always carried out in common in all five containers $C\text{-}12\text{-}5c_1$ through $C\text{-}12\text{-}5c_5$ and the sequence of the bits of these five signals is preserved.

The path overhead $POH_1$ through $POH_5$ is respectively attached in the following multiplexers M6 through M10, so that, virtual containers $VC\text{-}12\text{-}5c_1$ through $VC\text{-}12\text{-}5c_5$ are formed. The path overhead is defined in the CCITT Recommendation G.708, Section 5.1.

The tributary units $TU\text{-as-}5c_1$ through $TU\text{-}12\text{-}5c_5$ are generated in the multiplexers M11 through M15 by attaching a pointer PTR. This can be introduced with a fixed value since the clock matching already occurred in the containers $C\text{-}12\text{-}5c_1$. The tributary unit $TU\text{-}12\text{-}5c_1$ through $TU\text{-}12\text{-}5c_5$ corresponding to CCITT Recommendation G.709, Section 3.3 and, as shown in FIG. 8, are further handled similar to TU-12 signals, i.e. are combined into tributary unit groups TU-22 and TU-33, are supplemented with a path overhead VC-4-POH to form a virtual container VC-4 and, finally, are supplemented by joining the administrative unit pointers AU-4 PTR to form the STM-1 signal.

The steps from the TU-12 signals to the STM-1 signal just set forth, however, are not a component part of the present invention and are defined in CCITT Recommendations G.707 through G.709.

Figure 11:
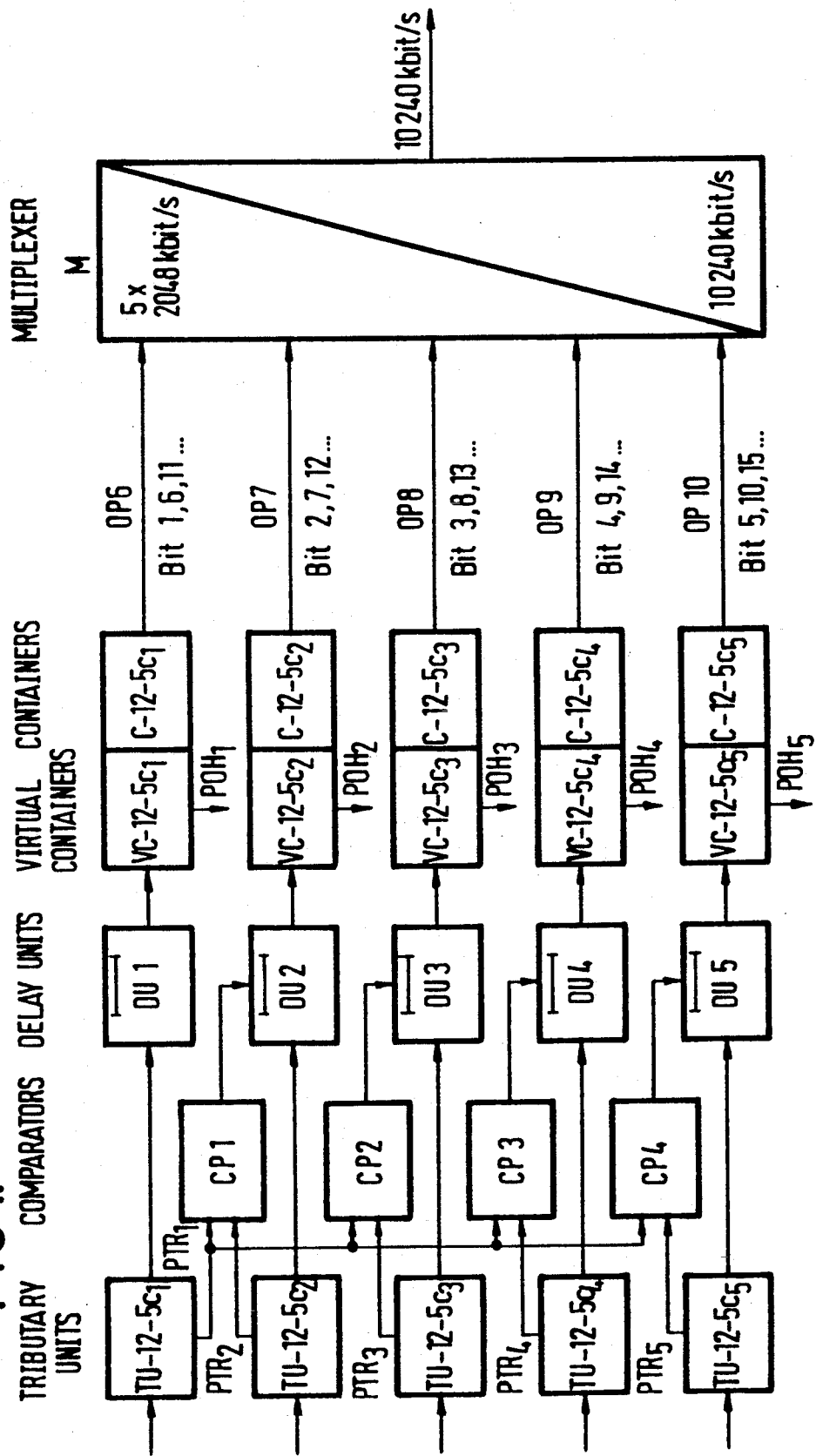
FIG. 11 depicts details of an inventive part of a block circuit diagram for demultiplexing operation.

FIG. 11 shows a detailed view of a block circuit diagram of the path B for the multiplexing case together with a multiplexer M. The arrangement contains tributary units $TU\text{-}12\text{-}5c_1$ through $TU\text{-}12\text{-}5c_5$, comparators CP1 through CP4, adjustable delay units DU1 through DU5, virtual containers $VC\text{-}12\text{-}5c_1$ through $VC\text{-}12\text{-}5c_5$, containers $C\text{-}12\text{-}5c_1$ through $C\text{-}12\text{-}5c_5$ and the multiplexer M.

The comparators CP1 through CP4 compare the pointer $PTR_1$ to the pointers $PTR_2$ through $PTR_5$ and set the delay units DU2 through DU5 according to the results of the comparison.

Figure 12:
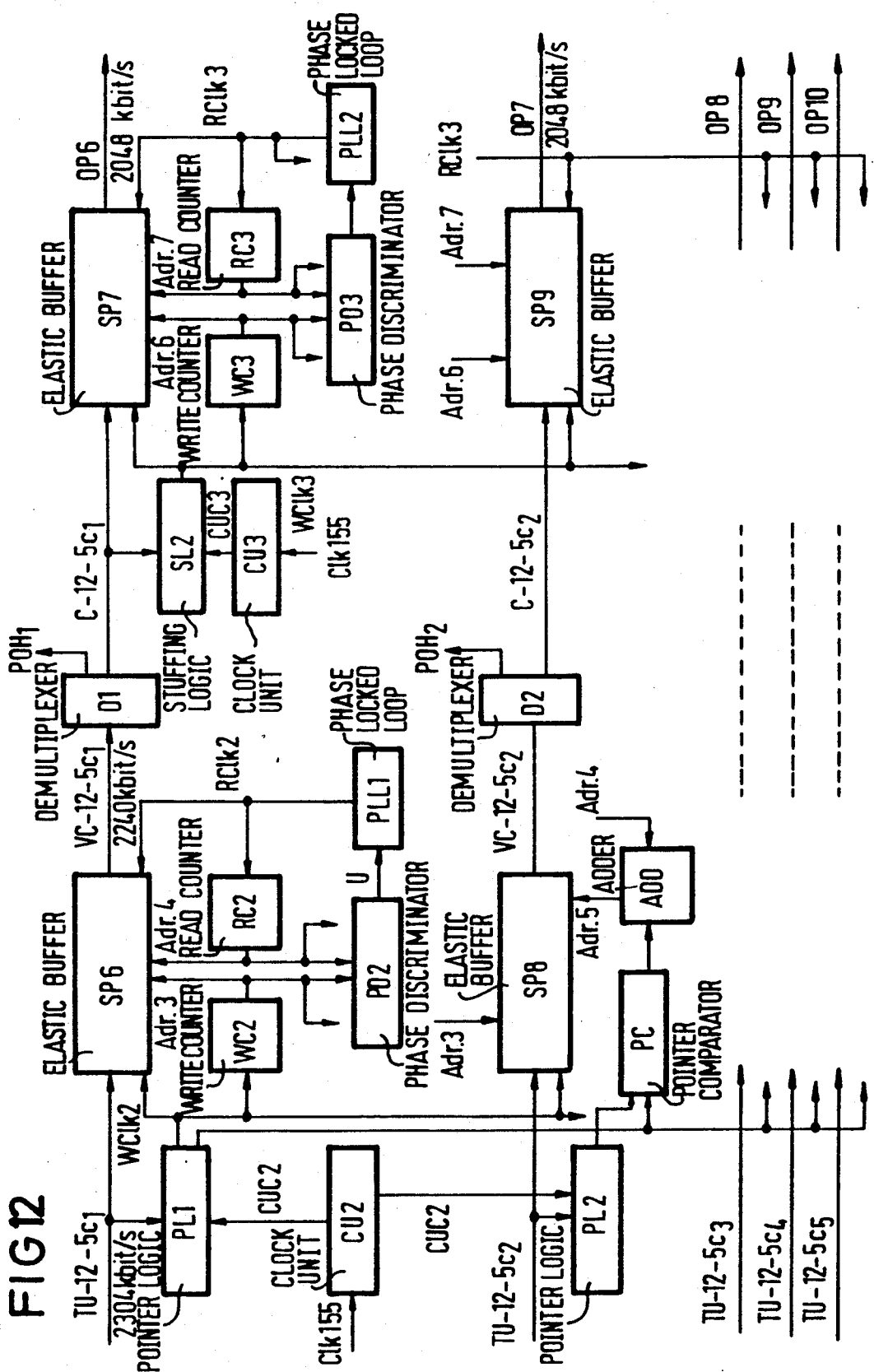
FIG. 12 depicts a circuit diagram of the FIG. 11.

FIG. 12 shows the circuit diagram related to the block circuit diagram of FIG. 11 without the multiplexer M. The arrangement contains pointer logics PL1 and PL2, clock units CU2 and CU3, elastic buffers SP6 through SP9, write counters WC2 and WC3, read counters RC2 and RC3, phase discriminators PD2 and PD3, phase locked loops PLL1 and PLL2, a pointer comparator PC, an adder ADD, demultiplexers D1 and D2 and a stuffing logic SL2.

The pointer of the TU-12-$5c_1$ signal is first evaluated in the pointer logic PL1. When this indicates that the pointer byte contains information, this is written into the elastic buffer SP6 in common with the remaining information bits. The write-in is controlled by the write counter WC2 that in turn receives the write-in clock WC1k2 via the pointer logic PL1 from the clock CU2 of the clock unit CU2. This operates with the 155.52 MHz clock C1k155 derived from the received STM-1 signal. The read-our from the elastic buffer SP6 occurs with the read-out clock RC1k2, whereby the read counter RC2 defines the read-out address Adr4. A comparison between the addresses Adr3 and Adr4 is implemented in the phase discriminator PD2. A control voltage U proportional to the phase deviation readjusts the phase locked loop PLL1 such in frequency that an optimally uniform read-out clock RC1k2 is generated.

The TU-12-$5c_2$ through TU-12-$5c_5$ signals are treated the same way, so that only the further-processing of the TU-12-$5c_2$ signals shall be set forth below. This is written into the elastic buffer SP8 with the write-in clock WC1k2 and with the write-in address Adr3. The pointer is evaluated in the pointer logic PL2. Even though the pointers are identically utilized at the transmission side for all TU-12-$5c_1$ through TU-as-$5c_5$ signals, the pointer values can be different since the individual signals were transmitted over the selected path independently of one another and thus experienced individual pointer adaptations. A potential deviation of the pointer value of the TU-12-$5c_1$ signal from that of the TU-12-$5c_2$ signal is identified in the pointer comparator PC.

A deviation of the TU-12-$5c_2$ pointer toward higher values indicates that the TU-12-$5c_2$ signal leads in phase by the differential amount in comparison to the TU-12-$5c_1$ signal. The read-out from the elastic buffer SP8 must therefore occur correspondingly later in order to achieve the same phase relation at the output of the elastic buffer SP8 for the VC-12-$5c_2$ signal as for the VC-12-$5c_1$ signal at the output of the elastic buffer SP6. A value corresponding to the pointer difference is added to the read-out address Adr4 of the elastic buffer SP6 in the adder ADD, an address Adr5 deriving as a result thereof.

Given a deviation of the TU-12-$5c_2$ in comparison to the TU-12-$5c_1$ toward lower values, a corresponding value is subtracted in the adder ADD.

As shown in FIG. 11 or, respectively, as shown by the blocks L1 through L5 in FIG. 5c, delay units are thus inserted into the paths of the TU-12-$5c_1$ through TU-12-$5c_5$ signals, these delay units having a fixed running time in the case of the TU-12-$5c_1$ signal and having variable running times in the case of the TU-12-$5c_2$ through TU-12-$5c_5$ signals.

The VC-12-$5c_1$ signal is supplied to the demultiplexer D1 wherein the path overhead $POH_1$ is coupled out. Subsequently, the justification control bits C1 and C2 of the C-12-$5c_1$ signal are evaluated in the stuffing logic SL2. In the case of a positive stuffing, clock pulses from the clock CUC3 generated in the clock unit CU3 are suppressed in stuffing logic SL2 at the time of the stuffing bits S1 and S2, in accord with CCITT Recommendation C.709, Section 5.6.1, so that only the useful information bits of the C-12-$5c_1$ signal are written into the elastic buffer SP7 with a write-in clock WC1k3. The clock unit CU3 derives at the clock CUC3 from the clock C1k155 that was derived from the received STM-1 signal.

The read counter RC3, the phase discriminator PD3 and the phase locked loop PLL2 work like the read counter RC2, the phase discriminator PD2 and the phase locked loop PLL1.

The path overhead $POH_2$ of the VC-12-$5c_2$ signal is coupled out in the demultiplexer D2. The remaining C-12-$5c_2$ signal is written into the elastic buffer SP9 with the write-in clock WC1k3 and with the address Adr6. A separate stuffing logic like for the C-12-$5c_1$ signal need not be provided for the C-12-$5c_2$ signal since the justification control bits C1 and C2 of the five TU-12-$5c_1$ through TU-12-$5c_5$ signals are identically utilized at the transmission side and were not modified on the transmission paths. The read-out from the elastic buffer SP9 occurs with the clock RC1k3 and with the address Adr7. The TU-12-$5c_3$ through TU-12-$5c_5$ signals are thus handled like the TU-12-$5c_2$ signal. The output signals OP6 through OP10 correspond to the original signals OP1 through OP5 of the transmission side, whereby the chronological sequence of the bits is guaranteed on the basis of the method of the invention. In the following multiplexer M of FIG. 11, the output signals OP6 through OP10 are in turn combined to form a 10240 kbit/s signal that corresponds to the signal of the transmission side from FIG. 9.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for transmitting a digital broadband signal having a bit rate of an intermediate hierarchy level via a multiplexing equipment, via a link network having cross-connect equipment controlled by an exchange, and via a demultiplexing equipment of a synchronous digital multiplex hierarchy, with conversion of the broadband signal into a tributary unit concatenation composed of at least two tributary units or composed of at least two tributary unit groups, and with allocation of a first pointer to the first tributary unit of the tributary unit concatenation, the method comprising the steps of:

allocating respectively one pointer of an identical value as that of the first pointer to all following tributary units;

transmitting independently of one another the tributary units;

recognizing the chronological arrival of the tributary units at the receive side via their pointers; and chronologically regenerating the tributary unit concatenation by a delay of leading tributary units.

2. The method according to claim 1, wherein the tributary unit concatenation is formed of at least one tributary unit and of at least one tributary unit group.

3. A method for transmitting a digital broadband signal having a bit rate of an intermediate hierarchy level via a multiplexing equipment, via a link network having cross-connect equipment controlled by an exchange, and via a demultiplexing equipment of a synchronous digital multiplex hierarchy, the method comprising the steps of:

converting the broadband signal into a tributary unit concatenation composed of at least two tributary units or composed of at least two tributary unit groups;

allocating a first pointer to the first tributary unit of the tributary unit concatenation;

allocating respectively one pointer of an identical value as that of the first pointer to all following tributary units;

transmitting independently of one another the tributary units;

recognizing the chronological arrival of the tributary units at the receive side via their pointers; and chronologically regenerating the tributary unit concatenation by a delay of leading tributary units.

4. The method according to claim 3, wherein the tributary unit concatenation is formed of at least one tributary unit and of at least one tributary unit group.

* * * * *